United States Patent

[11] 3,539,051

[72] Inventor Kurt S. Stone
 Norwalk, Connecticut
[21] Appl. No. 883,102
[22] Filed Dec. 8, 1969
[45] Patented Nov. 10, 1970
[73] Assignee Dorr-Oliver Incorporated
 Stamford, Conn.,
 a corporation of Delaware

[54] SEDIMENTATION TANK WITH PIER-SUPPORTED ROTARY RAKE STRUCTURE
14 Claims, 16 Drawing Figs.

[52] U.S. Cl. ................................................. 210/520,
 210/528
[51] Int. Cl. ....................................................... B01d 21/06
[50] Field of Search .................................... 210/520,
 528

[56] References Cited
UNITED STATES PATENTS
2,205,199 6/1940 Hubbell et al. ............... 210/520

Primary Examiner—J. L. DeCesare
Attorneys—Theodore M. Jablon, D. M. Mezzapelle and J. Dennis Malone ABSTRACT: Sedimentation tank with rotary rake structure supported on a hollow center pier the upper end portion of which delivers the upflowing feed suspension into the annular space defined by a feed well cylinder which surrounds the central upright cage portion of the rake structure, with the addition of a system of vertical baffle plates interposed in the path of the feed liquid within the feed well cylinder, and arranged so as to divide the influent feed into a pair of counter currently rotating streams one above the other, effective to disperse the influent flow energy, to avoid "plunging" and disturbance of the sedimentation zone.

Patented Nov. 10, 1970

INVENTOR.
KURT S. STONE
BY Theodore M. Jablon

ATTORNEY.

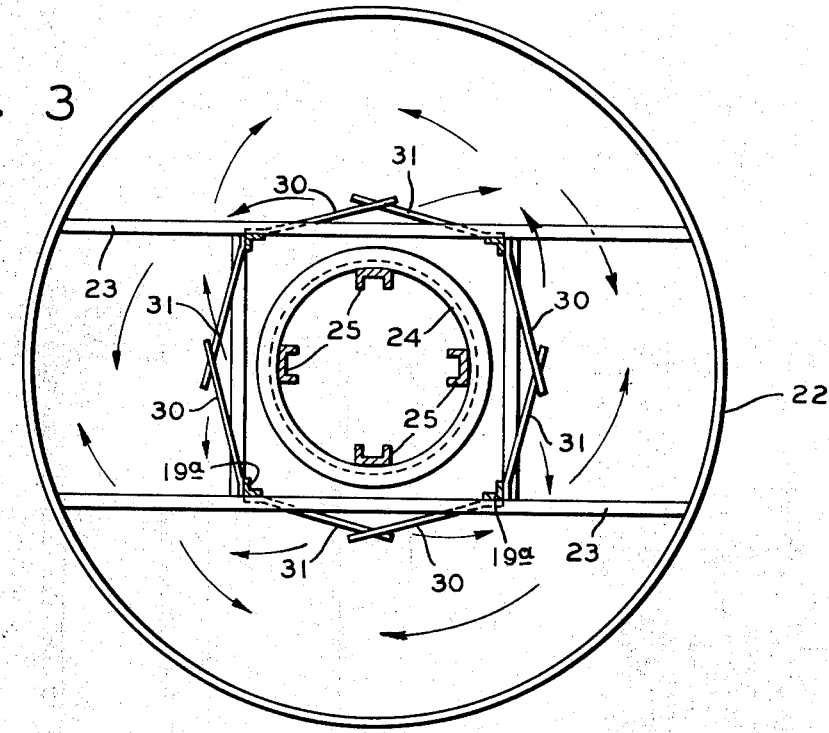
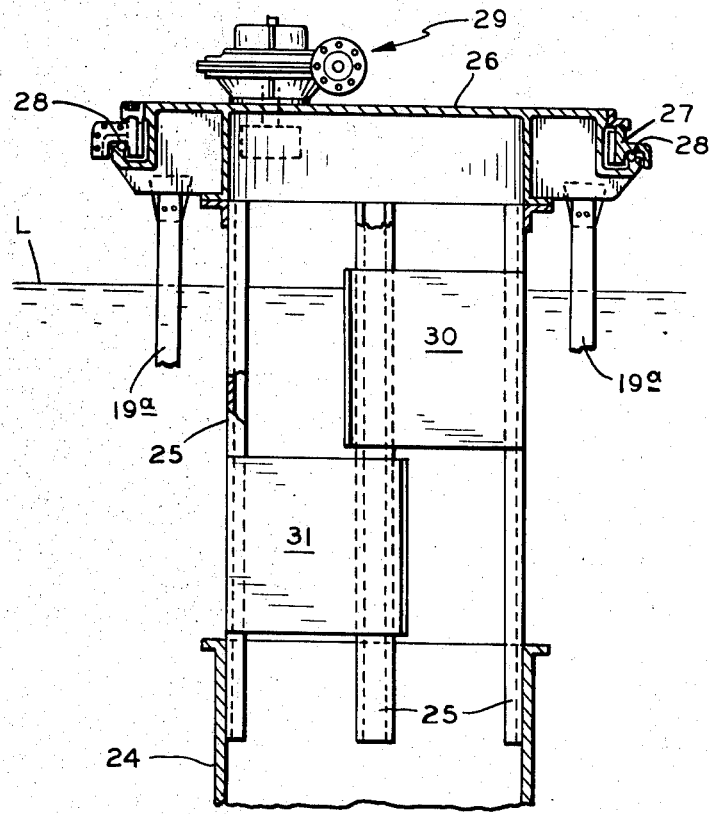
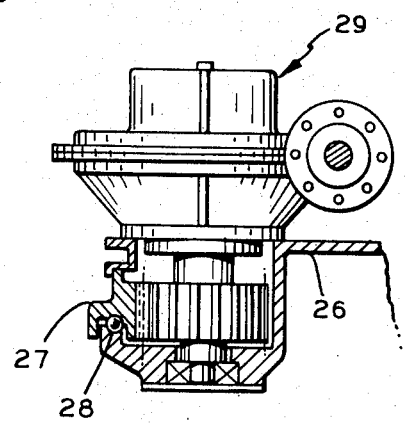

Patented Nov. 10, 1970
3,539,051
Sheet 3 of 4
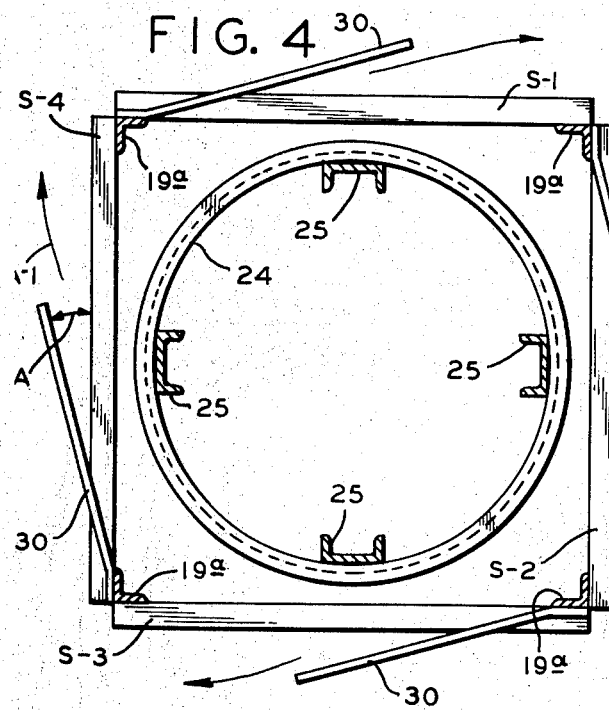
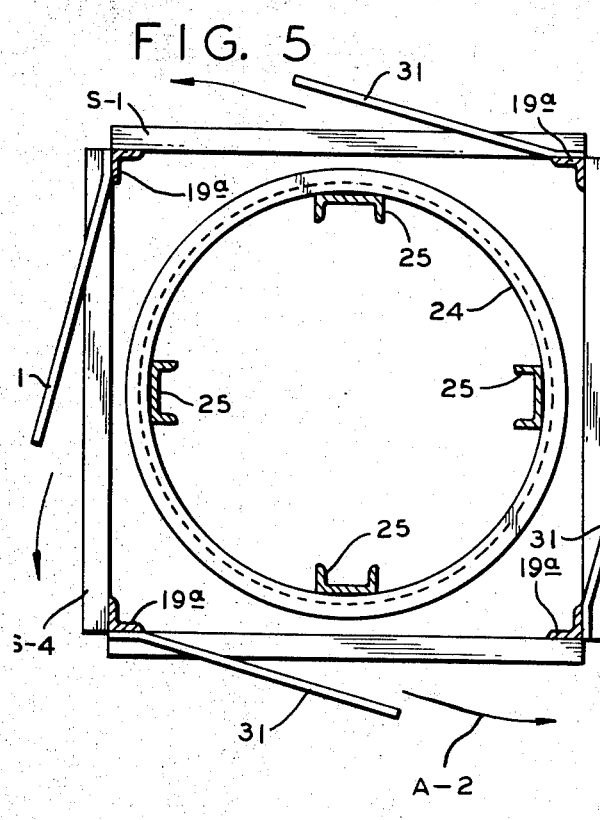
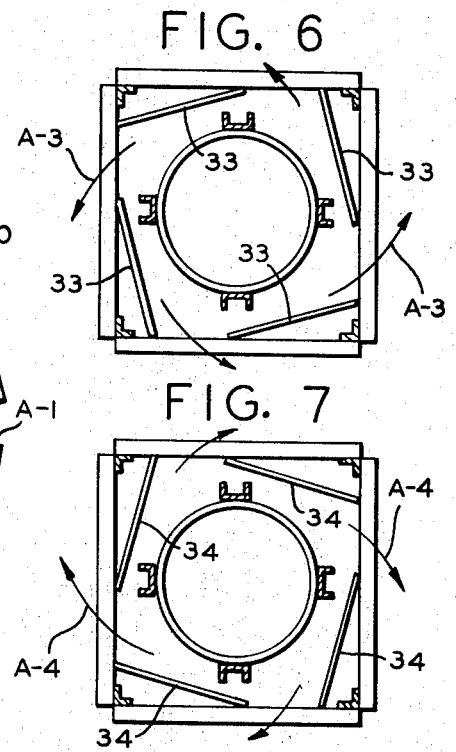
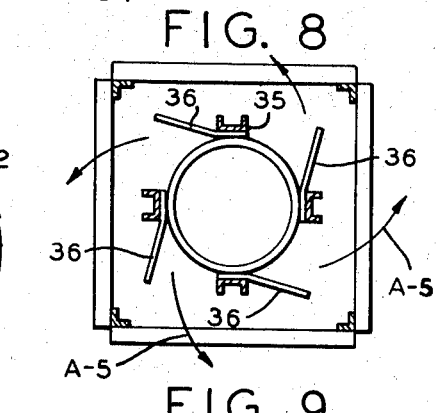
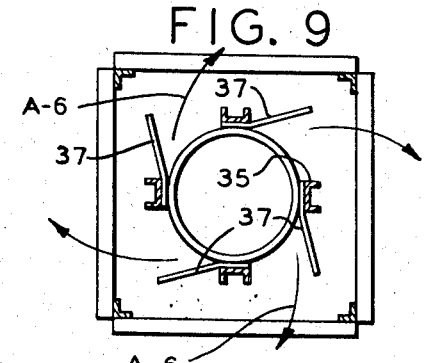
INVENTOR.
KURT S. STONE
BY Theodore M. Jablon
ATTORNEY.

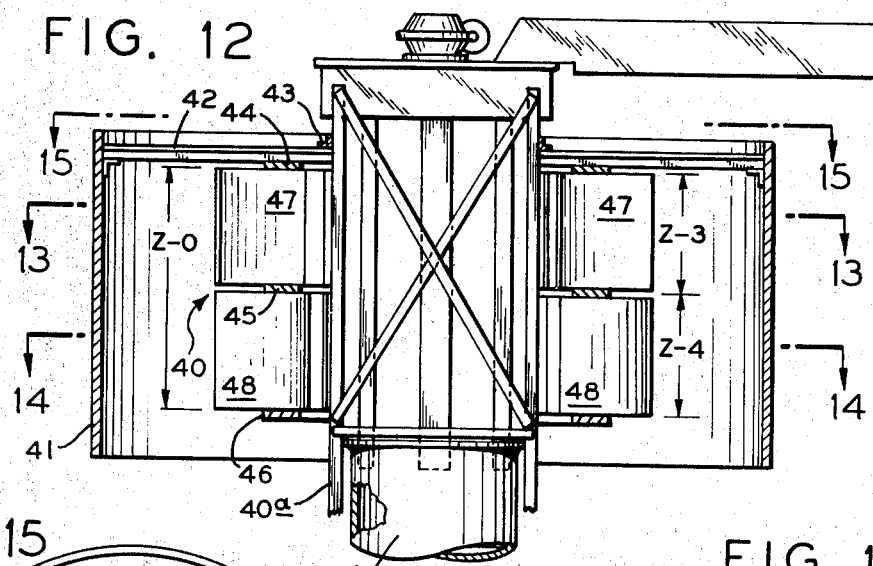
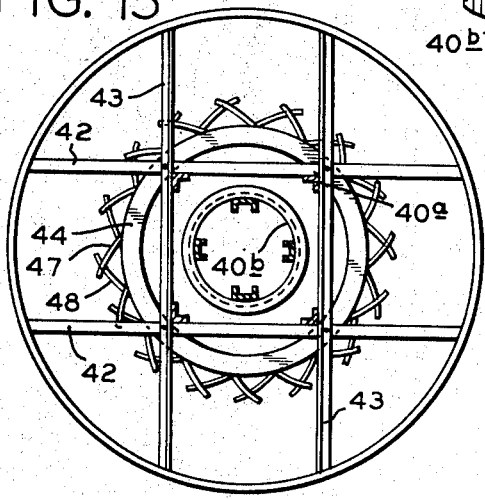
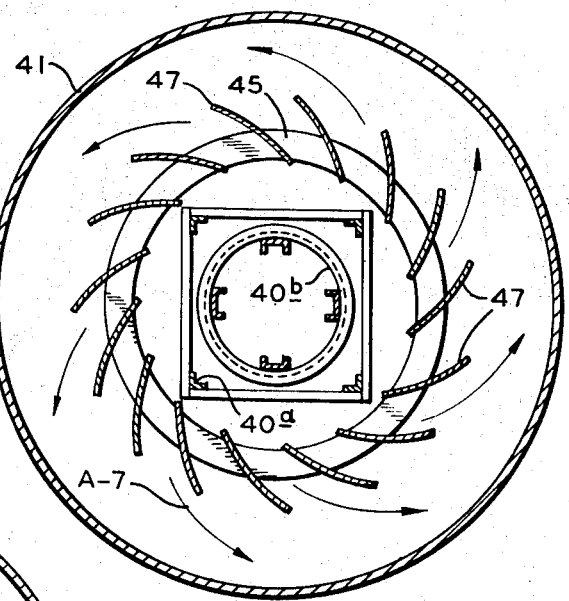
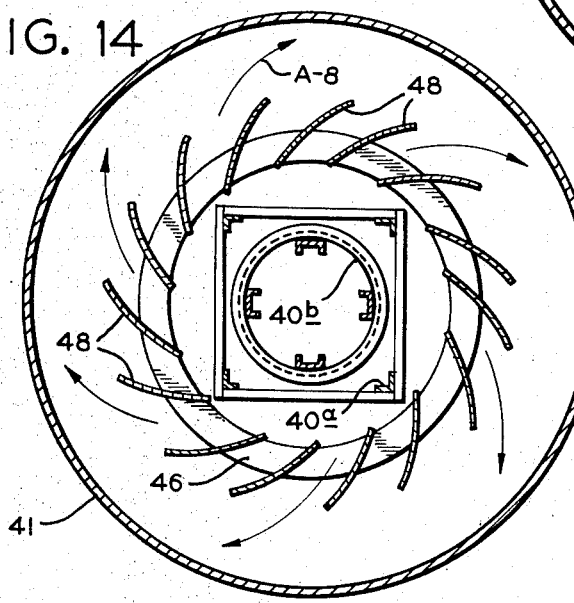
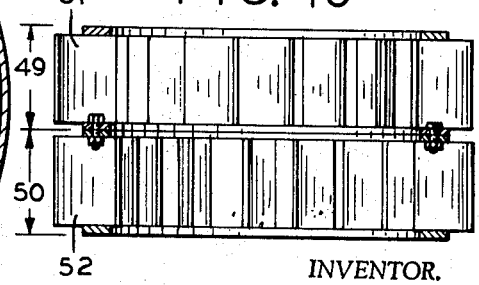
INVENTOR.
KURT S. STONE
BY Theodore M. Jablon
ATTORNEY.

SEDIMENTATION TANK WITH PIER-SUPPORTED ROTARY RAKE STRUCTURE

This invention relates to sedimentation tanks having a rotating sediment raking structure, and more particularly means for improving the operation of the central feed well or feed well cylinder surrounding a central zone of feed influent supply, which in turn improves the sedimentation efficiency of the tank.

This invention is concerned with improving feed influent conditions known as "plunging" which may occur due to the influent streams impinging upon the surrounding wall of the feed well cylinder. Plunging tends to disturb a sedimentation pattern wherein it is desirable to have the influent streams directed more gently in shallow flow curves towards the peripheral overflow of the tank.

According to the invention, the feed influent conditions and thus the sedimentation efficiency of the tank are improved by the provision of novel and effective influent energy dispersing- or energy-consuming means or a system of baffle plates interposed in the radial paths of the influent stream within the feed cylinder.

The invention is preferably applicable to, and herein illustrated as embodied in a sedimentation tank wherein a sediment raking structure is supported for rotation upon a center pier, with drive means which may also be mounted upon the pier. The rake structure has rake arms extending horizontally from a central vertical cage portion which surrounds the center pier, and is supported by annular bearing atop the pier, allowing the rake structure as a whole to be rotated about the vertical axis of the pier. A cylindrical feed well surrounds the upper end portion of the cage structure, which may be supported from a stationary structure such as the center pier or from a bridge, or else it may be mounted upon and carried by the rake structure itself to rotate unitary therewith.

This flow energy dispersing system of baffle means of this invention is simple and readily applicable to tank installations of the type set forth above. The system comprises an assembly of vertical baffle elements. These baffle elements are interposed in the path of the feed liquid delivered from the upper end portion of the center pier in all directions into the space defined by the feed well cylinder surrounding the cage portion of the rake structure.

This system of baffle means is so constructed and arranged that one portion of the feed liquid in an upper horizontal zone is deflected tangentially in one direction, while a second portion of the liquid in a directly subjacent horizontal zone is similarly diverted or deflected in the opposite direction. Thus, the two zones contain counter currently directed annular streams confined within the feed well cylinder and dispersing or neutralizing each others flow energy. Due to intermixing of the two streams, the resultant downflow from the feed well will then have a flow velocity substantially uniform across the entire downflow area within the feed well cylinder. This avoids "plunging" and undue sedimentation disturbance, while allowing the liquid to follow the aforementioned desirable flow pattern of shallow flow lines from the feed well cylinders to the peripheral tank overflow.

In one embodiment of the invention, the baffle plates are fixed outwardly to the cage portion of the rake structure, so as to rotate therewith, while cooperating with feed influent delivery passages in the pier.

In another embodiment the baffle plates are fixed to the pier in cooperative relationship with the feed influent delivery passages, and arranged to clear the surrounding cage portion of the rotating rake structure.

In still another embodiment, an influent energy dispersing baffle system in the form of an annular construction surrounds the central cage portion of the rake structure and the feed influent zone, comprising an upper and a lower set of vertical flow deflecting blades, slanted in directions opposite to one another.

Other features and advantages will hereinafter appear.

As this invention may be embodied in several forms without departing from the spirit or essential characteristics thereof, the present embodiment or embodiments are illustrative and not restrictive. The scope of the invention is defined by the appended claims rather than by the description preceding them, and all embodiments which fall within the meaning and range of equivalency of the claims are therefore intended to be embraced by those claims.

IN THE DRAWINGS

FIG. 3 is a cross-sectional view taken on line 3–3 in FIG. 2, showing the disposition of the baffle plates in both the upper and the lower zones, relative to one another.

FIG. 4 is a further enlarged detail cross-sectional view taken on line 4–4 of FIG. 2, showing the clockwise disposition of the baffle plates in the upper zone.

FIG. 5 is a detail cross-sectional view taken on line 5–5 of FIG. 2, showing the counterclockwise disposition of the baffle plates in the lower zone.

FIGS. 6 and 7 are cross-sectional views similar to FIGS. 4 and 5, with the baffle plates carried by the cage portion internally thereof.

FIGS. 8 and 9 are cross-sectional views of the cage portion and pier, showing stationary baffle plates carried by the pier.

FIG. 10 is a vertical sectional view of the drive head for the rake structure, diagrammatically shown in FIG. 2.

FIG. 11 is a detail vertical sectional view of a pinion drive unit for the drive head of FIG. 2.

Figure 1:
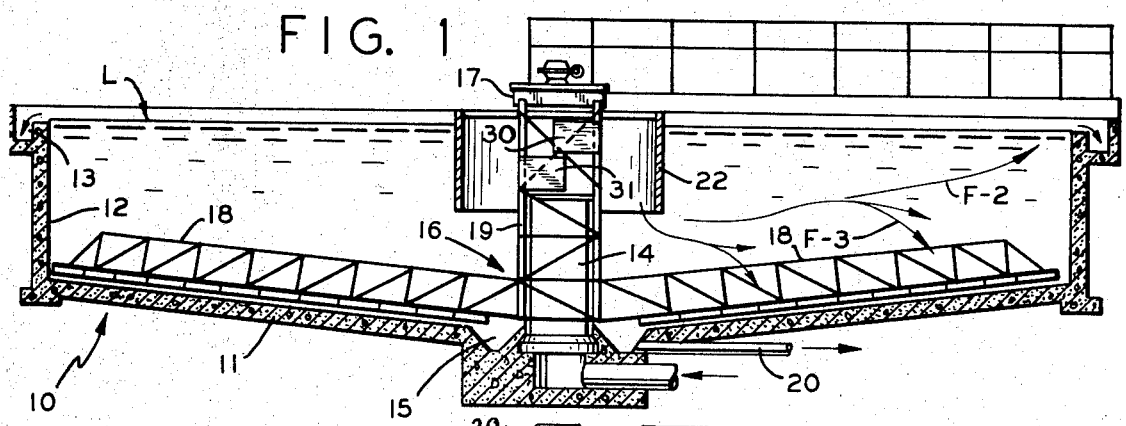
FIG. 1 is a semidiagrammatic vertical sectional view of a center pier type settling tank showing one embodiment of the invention, with the flow energy dispersing vertical baffle plates located in an upper and in a lower zone within the feed well cylinder.
Figure 2:
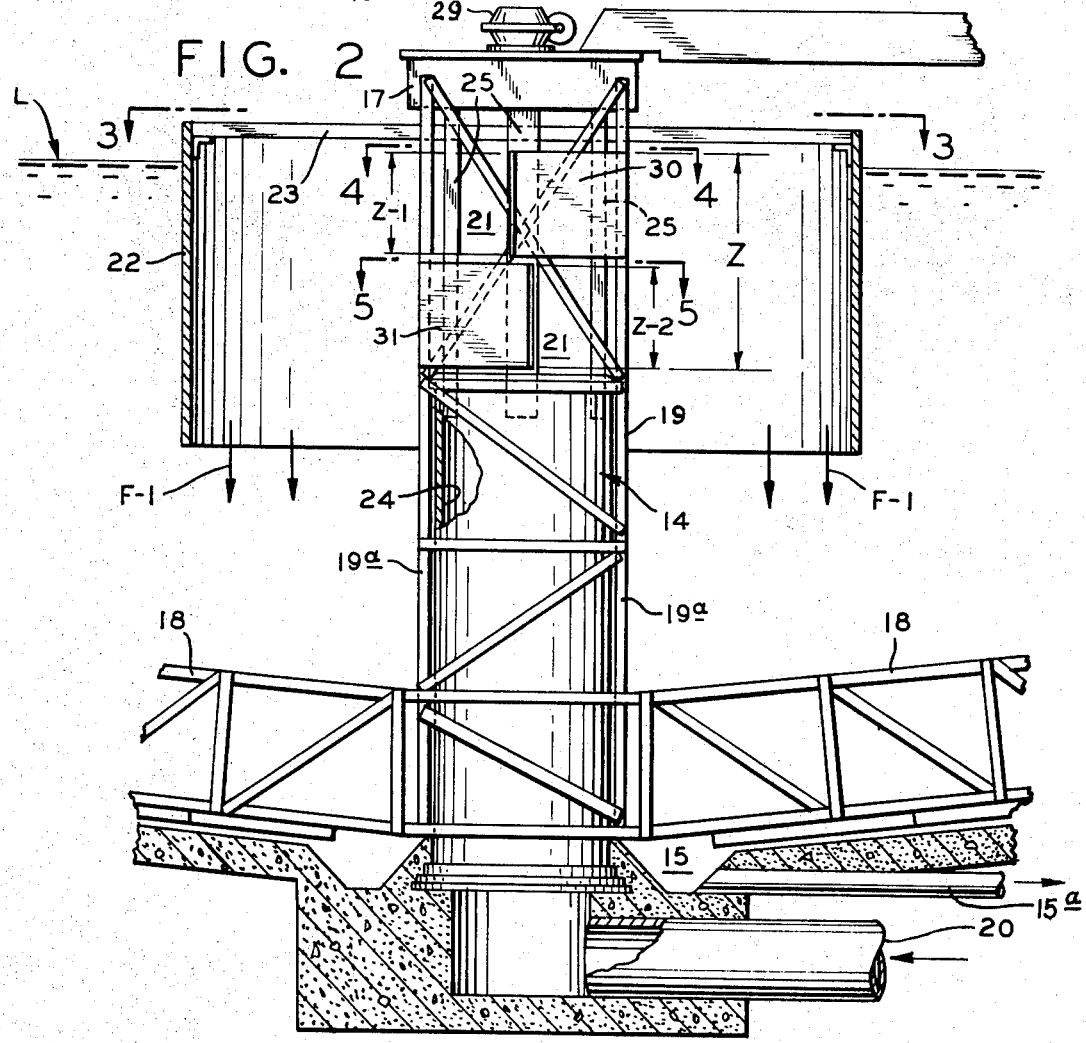
FIG. 2 is an enlarged vertical detail view taken from FIG. 1, showing the baffle plates as well as the feed well cylinder carried by the cage portion of the rake structure.

FIG. 12 similar to FIG. 2, shows another embodiment of counter currently directed sets of slanted baffle elements or blades constituting an annular structure surrounding the cage of the rake structure.

FIG. 13 is a cross-sectional view taken on line 13–13 in FIG. 12, showing the one set of flow deflecting blades slanted in one direction in an upper zone.

FIG. 14 is a cross-sectional view taken on line 13–13 in FIG. 12, showing the other set of flow deflecting blades slanted in the opposite direction in a lower zone.

FIG. 15 is a cross-sectional view taken on line 15–15 in FIG. 12.

FIG. 16 shows another form of the annular baffle structure detached.

A continuously operating sedimentation apparatus or settling tank herein shown to illustrate the invention, may be of a conventional center-pier type construction wherein there is a tank structure 10 having a bottom 11, a circular wall 12 with peripheral overflow launder 13 defining the overflow level L of a body of liquid in the tank, undergoing sedimentation. A center pier 14 rising from the tank bottom is surrounded at its foot end by an annular sludge sump 15 having a sludge withdrawal pipe 15a which sump receives settled solids or sludge moved over the tank bottom due to the operation of a rake structure 16 supported for rotation upon the pier, as indicated by a conventional drive head 17 mounted on the pier.

The rake structure has rake arms 18 fixed to an upright central cage portion or cage 19 which surrounds the pier, and has its upper end portion supported by an annular thrust bearing which is part of the drive head 17 shown more detailed in FIGS. 10 and 11. The cage 19 has vertical corner members 19a (see FIGS. 4 and 5) rigidly interconnected by various horizontal and diagonal brace members extending in the respective four vertical sides S-1, S-2, S-3, S-4 of what resembles a vertically elongate box structure.

Feed suspension is supplied from below the tank bottom, namely through feed pipe 20 to the interior of the hollow pier which at the top end has delivery passages 21 in a zone surrounded by the cage which in turn is surrounded by a feed well cylinder 22. Horizontal support members 23 connect the feed well cylinder with the cage, so as to rotate unitary therewith.

The pier comprises a cylindrical body portion 24 anchored to the tank bottom, and vertical posts 25 rising from the top end of the body portion, and upwardly terminating in an annular structural member which in turn supports the drive head 17. The space between the posts provides ample flow passage area in all directions for delivery of the feed liquid into the surrounding space defined by the feed well cylinder.

According to FIGS. 10 and 11, the drive head 17 comprises an annular turntable base 26, an internally toothed bull gear 27 fixed to the top end of the cage, and rotatable on the turntable base by way of interposed antifriction bearing elements 28. This bearing arrangement may be in the form of a combination bearing capable of sustaining the vertical load of the rake structure, as well as radial bearing forces. Driving power for rotating the rake structure is provided by a conventional pinion drive unit 29 (see also FIG. 11) mounted upon the turntable base, in driving engagement with the bull gear 27.

A system of vertical baffle plates according to this invention is located within the feed well cylinder for the purpose of consuming, dispersing, or neutralizing the flow energy of the influent liquid or suspension delivered through the passages 21 of the center pier.

In the embodiment shown in FIGS. 1 to 5, the baffle plates are attached externally to the cage, comprising an upper set of baffle plates 30 located in a horizontal zone Z-1, and thus located in the path of one portion of the feed liquid from the passages 21, and a lower set of baffle plates 31 located in a horizontal subjacent and adjoining zone Z-2, and thus located in the path of another portion of the feed liquid delivered from the passages 21.

Each of the vertical baffle plates 30 in the upper zone (see FIG. 4) has one vertical edge portion fixed to a respective vertical corner member 19a of the cage, in such a manner as to constitute with the associated side of the cage an enclosed angle A preferably in the order of about 15°. degrees. These baffle plates deflect the feed liquid in that zone in clockwise direction so as to maintain a circular stream in the annular space between the outer ends of the baffle plates and the surrounding feed well cylinder, as indicated by arrows A-1.

Each of the baffle plates 31 in the lower zone Z-2 (see FIG. 5) is similarly fixed to a respective vertical corner member of the cage, although pointed in the opposite direction. Hence, these baffle plates deflect the feed liquid in that zone in counterclockwise direction as indicated by arrows A-2, so as to maintain a circular stream directly subjacent and countercurrent to the one in the upper zone.

The baffle plates in this embodiment can be readily incorporated either in new, or in existing installations of bottom-fed center pier type sedimentation tanks.

A substantially uniform turbulence created by the interaction of the two countercurrent annular streams, while consuming the influent flow energy of the feed liquid within the feed well cylinder, produces a resultant downflow having substantially uniform flow velocity throughout the cross-sectional flow area in the feed well cylinder. The thus rectified flow of the feed liquid issuing from the feed well cylinder and indicated by flow lines F-1 (see FIG. 2), then tends to follow the aforementioned desired pattern of flow lines F-2 and F-3 (See FIG. 1), conducive to maintaining optimum sedimentation conditions, and thus maximum utilization and efficiency of the settling tank.

In the embodiment of FIGS. 6 and 7 the baffle plates are disposed internally of the cage, mounted across the corner portions of the cage in such a manner as to provide deflection of the feed influent streams within the feed well cylinder. Accordingly, FIG. 6 shows one set of vertical baffle plates 33 connected internally to the cage, and effective in the one horizontal zone to maintain a circular stream in one direction indicated by arrows A-3, while FIG. 7 shows another set of vertical baffle plates 34 connected internally to the cage, and effective in another horizontal zone to maintain a circular stream in the opposite direction indicated by arrows A-4.

In the embodiment of FIGS. 8 and 9 the two sets of baffle plates are located internally of the cage, although fixed to the posts 35 of the center pier, again in such a manner as to provide countercurrent deflection of the feed influent streams in the respective horizontal zones within the feed well cylinder. Accordingly, FIG. 8 shows one set of vertical baffle plates 36 fixed to respective posts 35, and effective in the one horizontal zone to maintain a circular stream in one direction indicated by arrow A-5, while FIG. 9 shows another set of vertical baffle plates 37 fixed to respective posts 35, and effective in another horizontal zone to maintain a circular stream in the opposite direction indicated by arrows A-6.

In the embodiment of FIGS. 12 to 15, the influent dispersing baffle system of this invention is in the form of an annular structure 40 surrounding the central cage portion 40a of the rake structure, as well as the feed influent zone Z-0 as represented by the height of the influent ports or passages 40b in the center pier. The baffle structure 40 in turn is surrounded by a feed well cylinder 41. In this example, the baffle structure 40 is supported from horizontal brace members 42 and 43 fixed to the rotating cage portion, and also supporting the feed well cylinder 41.

The annular baffle structure 40 comprises three vertically spaced ring members 44, 45, 46 concentric with the axis of the rake structure. The upper ring member 44 is rigidly connected to the intermediate ring member 45 by a first set of vertical flow deflecting plates or blades 47 slanted in one direction (see FIG. 13), so as to be effective to deflect one portion of the influent feed liquid into an annular stream as indicated by arrows A-7 in an upper zone Z-3 within the feed well cylinder.

The bottom ring member 46 is rigidly connected to the intermediate ring member by a second set of vertical flow deflecting plates or blades 48 which are slanted in the opposite direction (see FIG. 14), so as to be effective to direct another portion of the influent feed liquid into an annular stream as indicated by arrows A-8 in a lower zone Z-4, counter current to the annular stream in the upper zone Z-3.

In the modified form of FIG. 16, the annular baffle structure consists of two annular component baffle structures 49 and 50 coaxially arranged and endwise connected or bolted to one another. The flow deflecting blades 51 in the one component structure are slanted or curved in the one direction, while the blades 52 of the other component structure are slanted or curved in the opposite direction.

It should be understood that the annular baffle structure of FIGS. 12 to 16 may be supported in various ways other than the one herein shown, since the support may be derived either from the rotating rake structure or from the stationary center pier. Support may be derived in various structural combinations with the feed well cylinder which cylinder in turn may be supported either by the rake structure or by the pier or center column.

From the foregoing it may be seen that this invention provides effective means of great simplicity for improving the sedimentation capacity and efficiency of a bottom-fed center pier type of settling tank. The improvement being readily applicable to new as well as existing installations, is in the nature of a baffle system supported within the feed well cylinder, and surrounding the feed inlet ports in the center column which supports the rake structure through its center cage. The baffle system thus interposed in the paths of the feed suspension emanating radially in all directions from the feed inlet ports, is designed and effective to disperse or neutralize the radially directed influent energy by converting that energy into circular counter currently directed streams in respective zones one above the other within the confines of the feed well cylinder. This equalizes the downflow velocity of the feed liquid across the effective flow cross section within the feed well cylinder, thus favoring the formation of the ideal sedimentation pattern in the tank.

I claim:

1. A continuously operating settling tank which comprises in combination a tank structure having overflow means for clarified liquid and outlet means for sludge, a hollow center pier, a rotary rake structure for moving sludge over the tank bottom to said outlet means, which rake structure has a central upright cage portion surrounding the pier, bearing means effective between the upper end of the cage portion and the pier to support the rake structure for rotation about the pier, the upper part of the pier having flow passages facing outwardly in all directions for delivering feed suspension liquid rising in said hollow pier, means for supplying said liquid from below into the lower end of said hollow pier, a feed well cylinder surrounding the cage portion and the zone of said delivery passages, and a system of influent energy dispersing baffle plates located in the path of the liquid delivered through said passages into the surrounding space defined by said feed well cylinder, said system of baffle plates comprising an upper set of vertical baffle plates connected to the cage portion, and constructed and arranged in an upper horizontal zone so as to deflect one portion of the influent feed liquid from said passages in one circular direction in said zone, and a lower set of vertical baffle plates connected to said cage portion in a lower horizontal zone adjacent to said upper zone, and constructed and arranged so as to deflect another portion of the influent liquid from said passages in the opposite circular direction, whereby the thus induced countercurrent circular streams in zones within said feed well cylinder disperse each others flow energy, and whereby the feed liquid is displaced from the feed cylinder at a substantially uniform velocity across the area thereof into the body of liquid undergoing sedimentation in the tank.

2. The continuously operating settling tank according to claim 1, wherein said vertical baffle plates are connected to said cage structure exteriorly thereof.

3. The continuously operating settling tank according to claim 1, wherein said vertical baffle plates are connected to said cage portion interiorly thereof.

4. The continuously operating settling tank according to claim 1, wherein said cage portion has vertical corner members, and wherein said vertical baffle plates are fixed to respective corner members.

5. A continuously operating settling tank which comprises in combination a tank structure having overflow means for clarified liquid and outlet means for sludge, a hollow center pier, a rotary rake structure for moving sludge over the tank bottom to said outlet means, which rake structure has a central upright cage portion surrounding the pier, bearing means effective between the upper end of the cage portion and the pier to support the rake structure for rotation about the pier, the upper part of the pier having flow passages facing outwardly in all directions for delivering feed suspension liquid rising in said hollow pier, means for supplying feed liquid from below into the lower end of said hollow pier, a feed well cylinder surrounding the cage portion and the zone of said delivery passages, and a system of influent energy dispersing baffle plates located in the path of the liquid delivered through said passages into the surrounding space defined by said feed well cylinder, said system of baffle plates comprising an upper set of vertical baffle plates connected to said upper part of pier, and constructed and arranged in an upper horizontal zone so as to deflect one portion of the influent feed liquid from said passages into one circular direction in said zone, and a lower set of vertical baffle plates connected to said cage portion in a lower horizontal zone adjacent to said upper zone, and constructed and arranged so as to deflect another portion of the influent liquid in the opposite circular direction, whereby the thus induced counter current circular streams in said zones within the feed well cylinder disperse each others flow energy, and whereby the feed liquid is displaced from the feed cylinder at a substantially uniform velocity across the area thereof into the body of liquid undergoing sedimentation in the tank.

6. The continuously operating settling tank according to claim 5, wherein said pier comprises a cylindrical body portion rising from the tank bottom, a plurality of posts rising from the upper end of said body portion, said posts being evenly spaced about the periphery of said cylindrical portion, and supporting said bearing means for the rake structure, said posts constituting between them said feed influent delivery passages, and wherein said vertical baffle plates are fixed to respective posts.

7. A continuously operating settling tank which comprises in combination a tank structure having overflow means for clarified liquid and outlet means for sludge, a hollow center pier, a rotary rake structure for moving sludge over the tank bottom to said outlet means, which rake structure has a central upright cage portion surrounding the pier, bearing means effective between the upper end of the cage portion and the pier to support the rake structure for rotation about the pier, the upper part of the pier having flow passages facing outwardly in all directions for delivering feed suspension liquid rising in said hollow pier into the surrounding space defined by said feed well cylinder, means for supplying said liquid from below into the lower end of said hollow pier, a feed well cylinder surrounding the cage portion and the zone of said delivery passages, and a system of influent energy dispersing baffle means supported in the path of the liquid delivered through said passages and in cooperative relationship therewith, said system comprising an upper set of baffle members constructed and arranged in an upper horizontal zone so as to deflect one portion of the influent liquid from said passages in one circular direction in said zone, and a lower set of baffle members constructed and arranged in a lower horizontal zone adjacent to said upper zone, so as to deflect another portion of the influent liquid from said passages in the opposite circular direction, whereby the thus induced counter current circular streams in said zones within said feed well cylinder disperse each others flow energy, and whereby the feed liquid is displaced from the feed cylinder at a substantially uniform velocity across the area of the flow cross section thereof into the body of liquid undergoing sedimentation in the tank.

8. A continuously operating settling tank which comprises in combination:
   a tank structure having overflow means for clarified liquid and outlet means for sludge, a hollow center pier, a rotary rake structure for moving sludge over the tank bottom to said outlet means which rake structure has a central upright cage portion surrounding the pier, bearing means effective between the upper end of the cage portion and the pier to support the rake structure for rotation, the upper part of the pier having flow passages facing outwardly in all directions for delivering feed suspension liquid rising in said hollow pier, a feed well cylinder surrounding the cage portion and the zone of said delivery passages;
   and a system of influent energy dispersing baffle elements in the form of an annular structure surrounding said cage portion substantially concentric with the axis of rotation of the rake structure, said annular structure comprising a first set of vertical flow-deflecting blades arranged in a circle around an upper influent zone, said blades being slanted so that the influent liquid in said zone is deflected into an annular stream in one direction; and
   a second set of vertical flow deflecting blades arranged in a circle around a lower influent zone directly below and adjacent to said upper zone, said blades being slanted so that the influent liquid in said zone is deflected into an annular stream in a direction opposite to said first stream, whereby the thus induced counter current annular streams within said feed well cylinder disperse each others flow energy, so that the feed liquid is displaced from the feed cylinder at a substantially uniform velocity across the area thereof into the body of liquid undergoing sedimentation in the tank.

9. The apparatus according to claim 8, wherein said annular baffle structure is supported by the rake structure.

10. The apparatus according to claim 8, wherein said annular baffle structure is supported by the central cage portion of the rake structure.

11. The apparatus according to claim 8, wherein both the annular baffle structure and the feed well cylinder are supported by the rake structure.

12. The apparatus according to claim 8, wherein both the annular baffle structure and the feed well cylinder are supported by the cage portion of the rake structure.

13. The apparatus according to claim 8, wherein said annular baffle structure comprises an upper ring member, a bottom ring member, and an intermediate ring member spaced from said upper and said lower ring member so as to define said upper and lower zones, said first set of blades rigidly interconnecting the upper and the intermediate ring member, said second set of blades rigidly interconnecting the lower and the intermediate ring member.

14. The apparatus according to claim 8, wherein each of said sets of blades is in the form of a separate annular structural component unit, each component unit having a top ring member and a bottom ring member, and a respective set of blades rigidly interconnecting the respective top and bottom ring members, and means are provided for connecting said structural units concentrically with one another.